S. E. HALL.
TIRE AND RIM.
APPLICATION FILED MAR. 8, 1919.

1,333,915. Patented Mar. 16, 1920.

Inventor
Stewart E. Hall
By C. E. Humphrey
Attorney

UNITED STATES PATENT OFFICE.

STEWART E. HALL, OF AKRON, OHIO, ASSIGNOR OF ONE-HALF TO WILLIAM G. MOSER, OF AKRON, OHIO.

TIRE AND RIM.

1,333,915.   Specification of Letters Patent.   Patented Mar. 16, 1920.

Application filed March 8, 1919. Serial No. 281,425.

*To all whom it may concern:*

Be it known that I, STEWART E. HALL, a citizen of the United States, residing at Akron, in the county of Summit and State of Ohio, have invented new and useful Improvements in Tires and Rims, of which the following is a specification.

This invention relates to an improvement in elastic pneumatic tires for vehicle wheels, with which is combined a rim suitable for holding the tire in position on a wheel. The object of the invention is to provide a pneumatic tire suitable for road vehicles in which the use of beads on the tire is eliminated and in which the means for securing the tire to the rim are positive and are such as to insure secure retention of the tire on the rim. The construction of the tire is such that in order to utilize the same a rim especially adapted for holding the tire is required and the two are arranged to coöperate in forming a cushioning medium for a vehicle wheel.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

Figure 1:
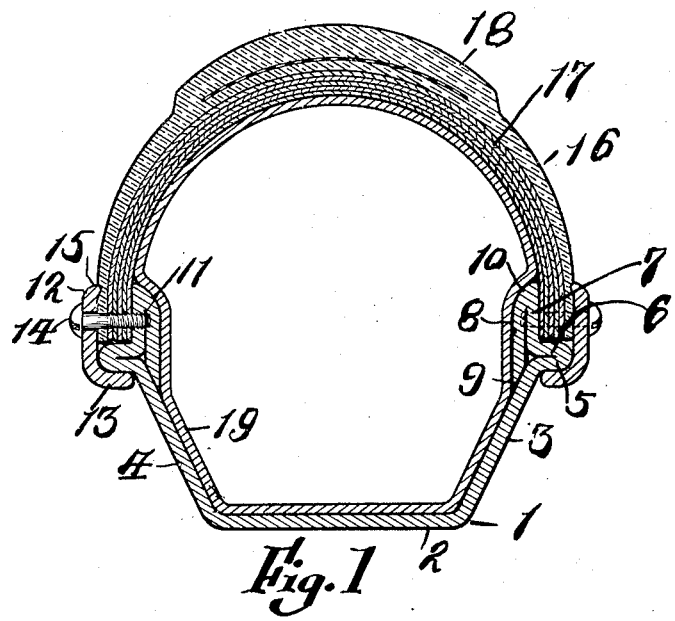
Figure 2:
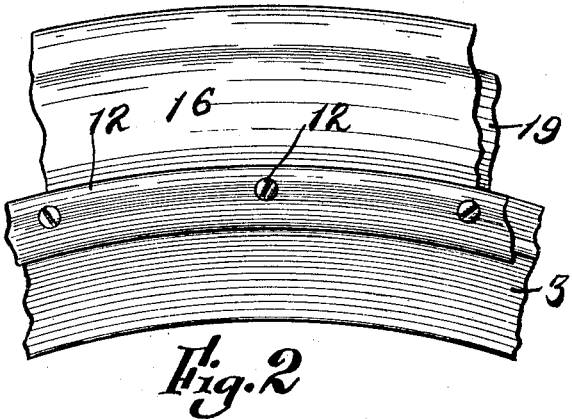

In the drawings in which similar reference numerals indicate like parts in the differnt figures, Figure 1 is a transverse sectional view of a tire and rim embodying the present invention, and Fig. 2 is a view in side elevation of a fragment of a tire and rim such as is shown in Fig. 1.

The subject matter of the present invention is a pneumatic tire of novel construction and in order to sustain the tire and secure it to the peripheral portion of a vehicle wheel a suitable coöperating rim is necessary as the tire is of such conformation as to be substantially incapable of application to the common well known rims now in use.

The rim which I utilize as a sustaining seat for the tire and which forms a part of the present invention comprises an annular trough-shaped member 1 embodying an inner cylindrical wall 2 which is adapted to seat on the outer face of the felly of the wheel. From the lateral portions of said wall extend outwardly-flaring inclined walls 3 and 4 preferably formed integrally with the wall 2. The outer formation of the walls 3 and 4 are similar and hence the description will be confined to the wall 3. At the outer portion of the wall 3 is a laterally-extending integral flange 5 which is fashioned by bending the material of the wall 3 at an obtuse angle thereof, while the material which extends beyond the lateral flange 5 is inbent laterally to form a flange 6 which lies in parallel contact with the outer face of the flange 5 and the two flanges 5 and 6 form an annular seat for a purpose to be later described. Extending outwardly from the inner lateral edge of the flange 6 is a flange 7 and from the outer edge of this flange is an inwardly-extending parallel flange 8, extending to and abutting against the outer face of the wall 3. This flange 8 has an inclined or chamfered edge 9 arranged to lie in snug engagement with the outer face of the wall 3. The outer portion of the flange 8 is formed upon curvilinear lines at 10 to provide a smooth surface for the inner tube later to be referred to. The outer lateral face of the flange 7 is substantially radial to the axis of the wheel on which the device is placed and forms in connection with the flange 6 an L-shaped circumferential seat. The flange 7 is provided with a series of separated threaded openings 11 for a purpose to be later described.

Arranged to coöperate with the rim just described are a pair of tire retaining rings and as they are similar, a description of one is believed to be sufficient. Each of these rings 12 is approximately L-shaped in cross section with the inner flange 13 thereof engaging the inner face of the flange 5 and provided with openings arranged to register with the openings 11 in the flange 7 and through which may be passed holding means 14 such as screws which engage in the threaded openings 11 in the flange 7 for a purpose to be later described. It is usually preferable in the construction of these retaining rings 12 to provide the outer edges thereof with lateral inturned ribs or ridges 15.

Adapted to coöperate with the rim just described is a tire 16, approximately semi-circular in cross section and constructed of the usual fabric 17 and thread 18. This tire being semi-circular is positioned by placing its inner edges in the seats formed by the flanges 6 and 7 and then applying the side retaining rings 12 in such a manner that the inner flange of each ring engages under one of the flanges 5 and then passing holding means such as screws 14 through the walls of the tire and securing the screws 14 in the threaded openings in the flanges 7 thereby drawing the rings 12 toward each other and clamping the inner edges of the tire against the flanges 7 to fixedly secure the tire in position. Previous to the positioning of the tire 16 there is placed within the rim an inflatable inner tube 19 which is blown up in the usual manner. The rounded or curvilinear faces 10 of the flanges 8 protect the inner tube 19 against damage and as the inner edges of the tire are firmly clamped against the lateral outer faces of the flanges 7 by means of the retaining rings 12, tight joints are formed between the flanges 7 and the faces of the tire 16 thus eliminating any danger of the inner tube 19 being blown into or pinched in the space between the rim and flange. In order to remove a tire of this construction all that is necessary to do is to remove the screws 14 after which the rings 12 may be dislodged and the tire 16 lifted from its seat.

I claim:

1. A vehicle wheel comprising a rim having outwardly flaring side walls, the outer edges thereof being bent outwardly and subsequently inwardly to provide a support, the remaining edge thereof being directed outwardly and thence inwardly to lie inwardly of the support, an arcuate shoe having the side edges mounted on the supports, and clamping rings engaging said shoe and supports.

2. A vehicle wheel comprising a rim having outwardly flaring side walls, seats formed at the outer edges thereof by bending the material upon itself, an arcuate shoe having its edges resting on said seats, rings engaging the seats and tire edges, and retaining means therefor passing through the ring, tire and part of the seat.

3. A vehicle wheel comprising a rim having outwardly flaring side walls, L-shaped seats formed at the edges thereof by bending the material upon itself, an arcuate tire having its edges resting on said seats, and retaining means for the tire passing therethrough, and into the vertical leg of said seats.

4. A vehicle wheel comprising a rim having outwardly flaring side walls, an annular seat formed at each outer edge thereof, each seat having a double wall at one side thereof, an arcuate tire having its edges resting on said seats, a ring associated with each tire edge and seat, and retaining means for each tire edge passing through the rings, inner edges of the tire and partially through the walls adjacent the seats.

In testimony whereof I have hereunto set my hand.

STEWART E. HALL.